United States Patent [19]

Bailey et al.

[11] Patent Number: 4,477,504

[45] Date of Patent: Oct. 16, 1984

[54] UTILIZATION OF PLASTIC FILMS TO CONTROL GAS PRESSURE AND REDUCE FOAM IN CELLULAR FOAM PRODUCTS

[75] Inventors: Larry E. Bailey, West Branch; Edward B. Morello, Iowa City, both of Iowa

[73] Assignee: Sheller-Globe Corporation, Toledo, Ohio

[21] Appl. No.: 408,792

[22] Filed: Aug. 17, 1982

[51] Int. Cl.³ ............................ B32B 3/10; B32B 5/20
[52] U.S. Cl. ...................................... 428/138; 428/159; 428/160; 428/318.8; 428/319.7
[58] Field of Search ................ 428/138, 314.4, 314.8, 428/316.6, 317.1, 317.7, 319.3, 319.7, 159, 160, 318.8; 156/285, 286, 287

[56] References Cited

U.S. PATENT DOCUMENTS 3,016,317  1/1962  Brunner ............................ 428/138
3,126,978  3/1964  Bergstrom ...................... 428/316.6
3,533,901  10/1970  Sutker ............................ 428/317.1
3,979,540  9/1976  Moffett .......................... 428/319.7
4,025,372  5/1977  Fenton ............................ 428/317.5
4,128,688  12/1978  Wiley ............................. 428/316.6

*Primary Examiner*—William J. Van Balen
*Attorney, Agent, or Firm*—Harness, Dickey & Pierce

[57] ABSTRACT

A cellular foam product having a composite foam supporting substrate and a method for making same. The composite substrate includes a load supporting structure to which a continuous barrier film is bonded. The barrier film seals openings in the structure through which gas pressure loss and foam leakage may occur during subsequent foam generating reaction processes. The substrate is formed by coating desired foam supporting surfaces of the supporting structure with an adhesive and vacuum forming a preheated thin flexible plastic film to the supporting structure to bond the film to the foam supporting surfaces.

24 Claims, 6 Drawing Figures

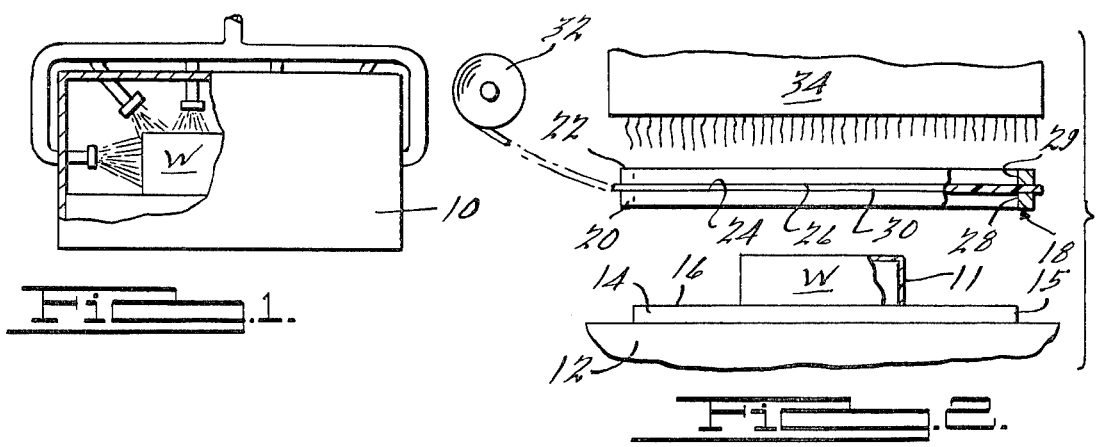

UTILIZATION OF PLASTIC FILMS TO CONTROL GAS PRESSURE AND REDUCE FOAM IN CELLULAR FOAM PRODUCTS

BACKGROUND AND SUMMARY OF THE INVENTION

The present invention relates to the manufacture of cellular foam products, and to an improved method which yields an improved and more economical final product by controlling and maintaining proper foam formation conditions and reducing foam flash during the manufacture of such products.

As is well known, the manufacture of cellular foam products involves reaction processes which include gas generation during the transformation of the reaction constituents via polymerization from a liquid to a cream to foam to a gell state. An example of such a process is the manufacture of urethane foam products by way of water blown foam systems. Such systems involve the reaction of water and isocyanate, which reaction results in the creation of carbon dioxide gas which acts as a blowing agent. A fluorocarbon auxiliary blowing agent is often the urethane foam. Gas evolution control during the reaction process is attained by balancing gellation catalysts with blowing catalysts. One of the problems associated with producing urethane foam products is the control of gas release during the foaming and/or foam curing process. More particularly, as the urethane polymerization reaction progresses toward a gell state, the polymer is prone to voiding or collapsing if internal foam cell pressure is not maintained.

A related problem in the manufacture of cellular foam products arises when there are open areas in substructural inserts or substrates utilized in final foamed assemblies, such as with automotive instrument panel or door panel applications. Such open areas result in foam leakage referred to in the industry as "flash". The loss of gas pressure through excessive foam flash or inadequate mold sealing can result in pressure voiding, leading to the need for repairing or scrapping of the resulting foam assembly. Moreover, the creation of flash during the manufacturing process requires additional material and labor costs necessitated by the creation and removal of such flash. In current practice, many methods have been utilized to decrease gas leakage and to reduce the creation of flash, including taping holes in assembly substrates, utilizing plugs of various compositions, and building shut-offs in foam curing tools. However, such methods present disadvantages in that they involve additional tooling costs, labor costs, or do not yield consistent results. It is, therefore, desirable to provide a method for manufacturing cellular foam products which allows for more consistent control of gas pressure during polymerization reaction processes, so that the opportunity for internal cell voiding or collapse in such products is reduced. It is moreover desirable to provide such a method which provides for more consistent control of and reduction of foam leakage, so that the creation of flash in final foam product assemblies is minimized. It is further desirable to provide such a method which yields an attendant reduction in tooling costs, as well as the material and labor costs associated with repairing, scrapping and trimming operations in the manufacture of such foam products, so that the above objectives can be achieved more readily and economically than with present cellular foam product manufacturing techniques.

The present invention is intended to satisfy the above desirable features and objectives through the provision of a new and improved method of making cellular foam products, wherein the substructural insert or load supporting member of the product is preworked prior to the foaming process to yield an insert/adhesive/plastic film composite substrate which significantly reduces the problems of gas pressure loss and foam leakage during foaming and curing processes. More particularly, the insert is first pretreated with a spray adhesive on its foam supporting faces. A thin flexible plastic film is thereafter stretched and formed over the insert to allow for an intimate contact between the film and the adhesive coated foam supporting faces of the insert. This process is accomplished most readily by way of a vacuum forming operation which causes the film to vacuum form to the shape of the insert and provide a continuous film barrier along its foam supporting faces. The vacuum can be held for desired periods of time to enhance intimate contact between the plastic film, insert and adhesive to enable sufficient bonding therebetween. The vacuum is thereafter removed and the operator may trim the film as desired to prepare the resulting composite substrate for loading into a conventional foam cure mold for foaming. The invention results in a significant reduction in gas pressure leakage and foam flash, and the resulting composite substrate yields an improved and more economical final foam product. Due to the fact that foam is inhibited from flashing through the substrate by way of the continuous plastic film barrier, the invention also results in lower scrappage and increased productivity.

The above and other features of the invention will become apparent from a reading of the detailed description of the preferred embodiment, which makes reference to the following set of drawings.

BRIEF DESCRIPTION OF THE DRAWINGS

FIG. 1 is an elevational view, partially in section, of a spray booth or chamber illustrating the initial treatment of a foam supporting workpiece or substrate with adhesive in accordance with the present invention;

FIG. 2 is a schematic view, partially in section, illustrating a subsequent step in the method of the present invention;

FIG. 3 is a partial sectional view illustrating a further step in the method of the invention;

FIG. 4 is a partial sectional view illustrating yet another step in the method of the invention;

FIG. 5 is a sectional view, partially in phantom, illustrating a further step in the method of the invention; and FIG. 6 is a partial sectional view of a composite foam product assembly made in accordance with the invention.

DETAILED DESCRIPTION OF THE PREFERRED EMBODIMENT

Referring now more specifically to the drawings, the method for making cellular foam products in accordance with the present invention is illustrated in a sequential fashion in FIGS. 1 through 5. To aid in describing this method, a workpiece serving as a substructural insert or load supporting member over which cellular foam is carried and supported in the resulting final product is indicated by reference letter W.

In accordance with the invention, the workpiece W is placed in a spray booth 10 and a spray-form adhesive is sprayed over the surfaces 11 of the workpiece W where adhesion of plastic film is desired. Areas which do not require film adhesion are masked according to normal painting techniques. Upon completion of this spraying operation, the adhesive treated workpiece W may thereafter be asided to a conveyor where solvents are flashed off. The workpiece W is then placed upon a vacuum form table 12 having an upwardly depending porous male form 14 which defines an outer periphery 15 extending generally normally of the table 12 and a generally planar workpiece supporting surface 16 having a myriad of holes therethrough and through which a vacuum may be applied.

Once the adhesive treated workpiece W is located on male form 14, application of a plastic film to the workpiece W for bonding with surfaces 11 is accomplished in the fashion utilizing the apparatus shown in FIGS. 2 through 4. The apparatus for applying the film includes a hollow film frame 18 having a pair of complementary-shaped frame portions 20 and 22 which define confronting film gripping faces 24 and 26, respectively. Frame portions 20 and 22 also define closed inner peripheral faces 28 and 29, respectively, each of which encloses an internal cross-sectional area slightly larger than that of male form 14, so that the film frame 18 may be fitted over male form 14. To utilize the frame 18, a desired plastic film 30 is first placed and gripped between gripping faces 24 and 26 of frame portions 20 and 22. While the film 30 may be presized to fit the frame 18, it may also be supplied from a continuous roll source 32 and passed through the film frame 18 in a semiautomatic continuous operation. The film 30 and frame 18 are then located adjacent a heat source 34 to preheat the film 30 and place it in a soft, more pliable condition. In the preferred embodiment of the invention, the frame 18 is elevated to a preheat position above the male form 14 and workpiece W, and a quartz infra red or chromalox type heater is moved into position above and behind the film frame 18 until it is directly over the film 30 for heating same.

At the completion of the film heating operation, indicated visually when the film 30 begins to sag due to gravity, the frame 18 is lowered toward the workpiece W and table 12 and fitted about male form 14. At this point, the frame portion 20 is in an abutting relationship with the table 12, with its inner face 28 confronting the outer periphery 15 of male form 14. This movement of frame 18 will force the plastic film 30 to be stretched over the workpiece W in a tent-like fashion in the manner shown in FIG. 3. Such a result may alternatively be achieved by moving the table 12 and workpiece W toward frame 18. Thereafter, a vacuum is applied to the tent-like opening between the film 30 and the porous workpiece supporting surface 16 of male form 14 by way of a vacuum generating means within the table 12 (not shown). This applied vacuum will cause the film 30 to vacuum form to the shape of the workpiece W and the supporting male form 14 as shown in FIG. 4. The vacuum can thereafter be held for an additional desired time period to enhance intimate contact between the film 30 and the adhesive coated surfaces 11 of workpiece W for facilitating bonding between surfaces 11 and the film 30. Once desired bonding is achieved, the vacuum is removed and the operator may separate the outer peripheral edges of the film 30 from frame 18 by passing a knife or other trimming tool 36 along faces 28 and 29 of the frame 18. The resulting workpiece/adhesive/film composite substrate 38 is shown in FIG. 5. The composite substrate 38 is thereafter trimmed as desired and loaded into a conventional foam cure mold (shown in phantom in FIG. 5 at 40) for foaming. The resulting final cellular foam product is illustrated at 42, which includes a cellular foam portion 44 carried and supported by the composite substrate 38.

The present method of manufacture offers many advantages over current methods employed in producing cellular foam products. More particularly, the method and the resulting composite substrate 38 enable the provision of a continuous plastic film barrier over any openings in the workpiece W. It has been found that this barrier significantly and consistently reduces the loss of gas pressure during subsequent polymerization reactions in foam cure molds, as well as the creation of foam flash. The continuous film barrier therefore provides for more efficient control of gas pressure during the foaming process, so that the scrapping of parts due to voiding and underfills by reason of undesired gas release is reduced. Morever, the avoidance of excessive foam flash provides the additional advantages of enabling a reduction in the size of the foam shot utilized per product part, and a saving of trimming and cleaning labor costs for yielding a finished cellular foam product.

This selection of the type of film and adhesive for practicing the present invention depends upon the particular desired application. The selection of film type and thickness will depend upon the geometry of the workpiece W forming the load supporting structure for the foamed part. While film thicknesses can be varied between approximately 0.003 inches to approximately 0.050 inches and still perform satisfactorily, a workpiece W requiring a deep draw or having a wide open span will require thicker film stock than more shallow type workpiece forms. Satisfactory bonding between the workpiece, film, and a urethane foam can be achieved with treated polyolefin (polyethylene or polypropylene), ionomer resin, modified copolyester, polyvinyl chloride or styrene type films. On the other hand, the selection of a proper adhesive relates to parameters involving the attack of solvent carriers on the workpiece material, heat resistance and flammability requirements. Successful practice of the invention has been achieved using rubber, urethane or latex based adhesives applied to ABS (acrylonitrile-butadiene-styrene copolymer) and polyphenylene oxide workpieces. As should be readily apparent, practice of the invention is not limited to such materials, and the disclosed method is well-suited to any cellular foam product having a substrate workpiece material with open areas through which gas pressure losses and foam flash creation can be expected.

The invention has been found to provide the previously-described advantages in the manufacture of urethane foam automotive door panel, arm rest and instrument panel products. An application of the invention in an instrument panel foam product 50 is illustrated in FIG. 6. The instrument panel 50 includes a workpiece insert 52 composed of "Noryl"—a phenylene oxide-based resin material made by the General Electric Company. Bonded to the insert 52 is a thin film 54 comprising either "Barex", a modified copolyester made by Vinyl Plastics, Incorporated, of Sheboygan, Wis., or "Surlyn", an ionomer resin made by the E. I. Du Pont de Nemours Company. While the choice of film thickness for this application may be varied, it has been found that the optimum film thickness should range from 0.005 to 0.007 inches. Once the composite substrate formed by the insert 52 and film 54 is made, it can be loaded into a conventional foam cure mold for foaming to yield an instrument panel part having a urethane foam filler 56 of desired geometry and outer skin surface 58 such as shown in FIG. 6.

It is understood that the foregoing description is that of the preferred embodiment of the invention and that various changes and modifications may be made thereto without departing from the spirit and scope of the invention as defined in the appended claims.

What is claimed is:

1. A composite substrate and cellular foam product comprising:
   a generally rigid load supporting member having holes and openings therein;
   plastic barrier film means vacuum bonded over exterior portions of said load supporting member, said barrier film means being operative to render said exterior portions of said load supporting member impervious to reaction products which are generated during formation of said cellular foam and to define a seal extending across said holes and openings for inhibiting passage of said reaction products through said holes and openings to assist in controlling and maintaining proper foam formation; and
   cellular foam means molded over said barrier film means in a form which is operative to provide a desired final shape to the product.

2. A composite substrate and cellular foam product as set forth in claim 1 wherein said cellular foam means comprises urethane foam.

3. A composite substrate and cellular foam product as set forth in claim 1 wherein said cellular foam means comprises an integral skin urethane foam.

4. A composite substrate and cellular foam product as set forth in claim 1 wherein said load supporting member comprises an acrylonitrile-butadiene-styrene copolymer material.

5. A composite substrate and cellular foam product as set forth in claim 1 wherein said load supporting member comprises a phenylene oxide based resin material.

6. A composite substrate and cellular foam product as set forth in claim 1 wherein said barrier film means comprises a treated polyolefin film.

7. A composite substrate and cellular foam product as set forth in claim 6 wherein said treated polyolefin comprises polyethylene.

8. A composite substrate and cellular foam product as set forth in claim 6 wherein said treated polyolefin comprises polypropylene.

9. A composite substrate and cellular foam product as set forth in claim 1 wherein said barrier film means comprises an ionomer resin film.

10. A composite substrate and cellular foam product as set forth in claim 1 wherein said barrier film means comprises a modified copolyester film.

11. A composite substrate and cellular foam product as set forth in claim 1 wherein said barrier film means comprises a polyvinyl chloride film.

12. A composite substrate and cellular foam product as set forth in claim 1 wherein said barrier film means comprises a styrene film.

13. A composite substrate and cellular foam product as set forth in claim 1 wherein said barrier film means comprises a plastic film having a thickness of from approximately 0.003 inches to approximately 0.050 inches.

14. A composite substrate and cellular foam product as set forth in claim 1 wherein said barrier film means is vacuum bonded to said exterior portions of said load supporting member with a rubber adhesive.

15. A composite substrate and cellular foam product as set forth in claim 1 wherein said barrier film means is vacuum bonded to said exterior portions of said load supporting member with a urethane based adhesive.

16. A composite substrate and cellular foam product as set forth in claim 1 wherein said barrier film means is vacuum bonded to said exterior portions of said load supporting member with a latex based adhesive.

17. A composite substrate and cellular urethane foam product comprising:
   a generally rigid load supporting member formed from an acrylonitrile-butadiene-styrene copolymer material and having at least one through aperture therein;
   a thin flexible ionomer resin barrier film bonded over the exterior of said load supporting member and operative to render the exterior portions of said load supporting member impervious to reaction products which are generated during formation of said cellular urethane foam and to define a seal extending across said aperture for inhibiting passage of said reaction products through said aperture; and
   cellular urethane foam means molded over said barrier film in a form which is operative to provide a desired final shape to the product.

18. A composite substrate and cellular urethane foam product as set forth in claim 17 wherein said barrier film is bonded over the exterior of said load supporting member with an adhesive and the application of a vacuum.

19. A composite substrate and cellular urethane foam product comprising:
   a generally rigid load supporting member formed from an acrylonitrile-butadiene-styrene copolymer material and having at least one through aperture therein;
   a thin flexible modified copolyester barrier film bonded over the exterior of said load supporting member and operative to render the exterior portions of said load supporting member impervious to reaction products which are generated during formation of said cellular urethane foam and to define a seal extending across said aperture for inhibiting passage of said reaction products through said aperture; and
   cellular urethane foam means molded over said barrier film in a form which is operative to provide a desired final shape to the product.

20. A composite substrate and cellular urethane foam product as set forth in claim 19 wherein said barrier film is bonded over the exterior of said load supporting member with an adhesive and the application of a vacuum.

21. A composite substrate and cellular urethane foam product comprising:
   a generally rigid load supporting member formed from a polyphenylene oxide copolymer material and having at least one through aperture therein;
   a thin flexible ionomer resin barrier film bonded over the exterior of said load supporting member and operative to render the exterior portions of said load supporting member impervious to reaction products which are generated during formation of said cellular urethane foam and to define a seal extending across said aperture for inhibiting passage of said reaction products through said aperture; and cellular urethane foam means molded over said barrier film in a form which is operative to provide a desired final shape to the product.

22. A composite substrate and cellular urethane foam product as set forth in claim 21 wherein said barrier film is bonded over the exterior of said load supporting member with an adhesive and the application of a vacuum.

23. A composite substrate and cellular urethane foam product comprising:

a generally rigid load supporting member formed from a polyphenylene oxide copolymer material and having at least one through aperture therein;

a thin flexible modified copolyester barrier film bonded over the exterior of said load supporting member and operative to render the exterior portions of said load supporting member impervious to reaction products which are generated during formation of said cellular urethane foam and to define a seal extending across said aperture for inhibiting passage of said reaction products through said aperture; and cellular urethane foam means molded over said barrier film in a form which is operative to provide a desired final shape to the product.

24. A composite substrate and cellular urethane foam product as set forth in claim 23 wherein said barrier film is bonded over the exterior of said load supporting member with an adhesive and the application of a vacuum.

* * * * *

UNITED STATES PATENT AND TRADEMARK OFFICE
CERTIFICATE OF CORRECTION

PATENT NO. : 4,477,504

DATED : October 16, 1984

INVENTOR(S) : Larry E. Bailey et al

It is certified that error appears in the above-identified patent and that said Letters Patent is hereby corrected as shown below:

Column 1, line 25, after "often" insert --added to aid in material flow or to reduce the overall molded density of--

Column 3, line 19, after "the" insert --following--

Signed and Sealed this

Ninth Day of April 1985

[SEAL]

Attest:

DONALD J. QUIGG

Attesting Officer

Acting Commissioner of Patents and Trademarks